Oct. 29, 1957 — E. L. ALLEN — 2,811,381
DOOR CONTROL MECHANISM
Filed Dec. 28, 1950 — 8 Sheets-Sheet 1

INVENTOR.
EDWIN L. ALLEN
BY
Bosworth & Sessions
ATTORNEYS.

INVENTOR.
EDWIN L. ALLEN
BY
Bosworth & Sessions
ATTORNEYS.

Oct. 29, 1957  E. L. ALLEN  2,811,381
DOOR CONTROL MECHANISM
Filed Dec. 28, 1950  8 Sheets-Sheet 3

INVENTOR.
EDWIN L. ALLEN
BY
Bosworth & Sessions
ATTORNEYS.

INVENTOR.
EDWIN L. ALLEN
BY
Bosworth & Sessions
ATTORNEYS.

INVENTOR.
EDWIN L. ALLEN
BY
Bosworth & Sessions
ATTORNEYS.

Oct. 29, 1957  E. L. ALLEN  2,811,381
DOOR CONTROL MECHANISM
Filed Dec. 28, 1950  8 Sheets-Sheet 6

INVENTOR.
EDWIN L. ALLEN
BY
Bosworth & Sessions
ATTORNEYS.

Oct. 29, 1957  E. L. ALLEN  2,811,381
DOOR CONTROL MECHANISM
Filed Dec. 28, 1950  8 Sheets-Sheet 7

INVENTOR.
EDWIN L. ALLEN
BY
Bosworth & Sessions
ATTORNEYS.

United States Patent Office 2,811,381
Patented Oct. 29, 1957

2,811,381

DOOR CONTROL MECHANISM

Edwin L. Allen, Cleveland Heights, Ohio

Application December 28, 1950, Serial No. 203,160

6 Claims. (Cl. 292—280)

This invention relates to door control mechanisms and more particularly to an improved door latching and locking apparatus especially adapted for use on automobile doors.

My present invention contemplates an improved latch mechanism of the general type in which a rotatably supported symmetrical toothed latch member (sometimes referred to as a "gear" type latch member) is caused to have latching engagement with a toothed keeper when the door is closed. In this type of mechanism the latch member is mounted for free rotation when the latch is released and detent means are provided for releasably holding the latch member against rotation in door opening direction.

As will appear from the following description, my improved latch mechanism enables certain desirable operating characteristics, set forth hereinafter, to be obtained; is extremely simple, rugged and efficient; has a minimum number of parts; and may be economically manufactured. Among the objects of my invention is the provision of a latch mechanism having a symmetrical toothed latch member mounted for free rotation when released and a lock member for preventing release of said latch member, which by slight changes in the form of the lock member may be modified to provide a latch mechanism having any of the following operating characteristics: (a) the lock member, if locked when the door is open, will automatically be moved into unlocked position upon closing the door, and operation of the inside remote control means in latch releasing direction will unlock the lock member if it is in locked position; (b) the lock member, if locked when the door is open, will automatically be moved into unlocked position upon closing the door, and operation of the inside remote control means will not unlock the lock member if it is in locked position; (c) the lock member, if locked when the door is open, will remain locked upon closing the door, and operation of the inside remote control means in latch releasing direction will unlock the lock member if it is in locked position; and (d) the lock member, if locked when the door is open, will remain locked upon closing the door, and operation of the inside remote control means will not unlock the lock member.

The above and other objects of my invention will appear from the following description of several embodiments thereof, reference being had to the accompanying drawings in which.

Figure 1:
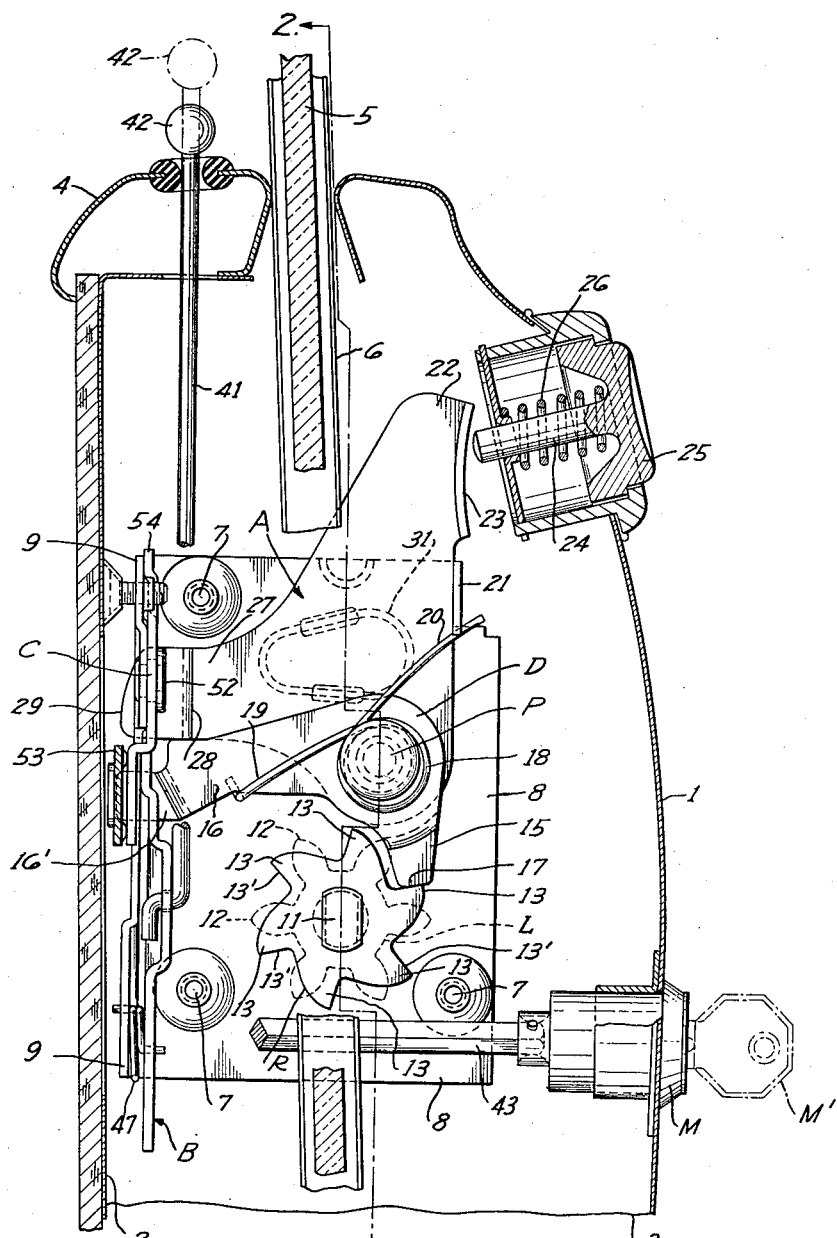
Figure 1 is a vertical transverse cross-sectional view through a typical automobile door in which my improved latch mechanism has been installed, the door being shown in closed, latched, and locked position.
Figure 2:
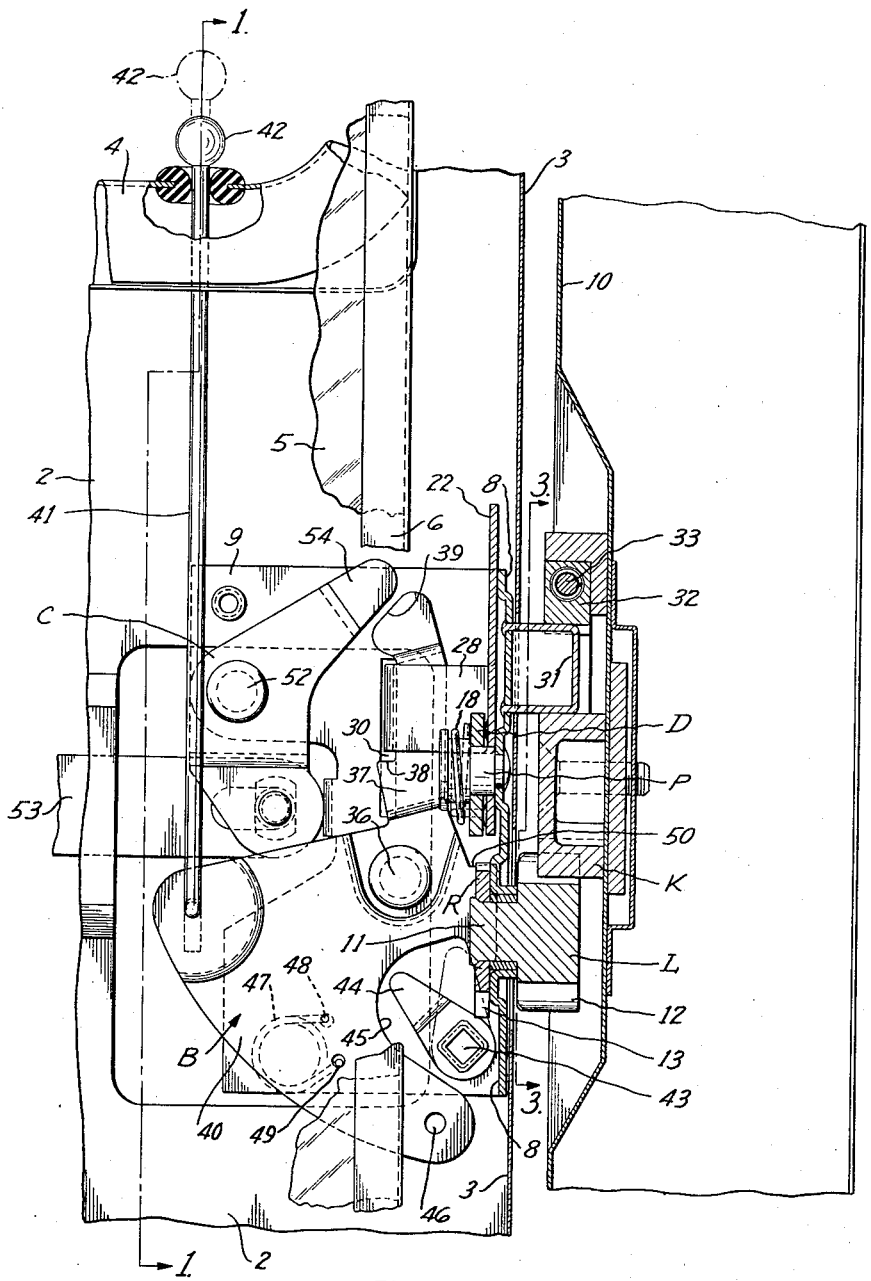
Figure 2 is a vertical transverse cross-sectional view taken substantially on line 2—2 of Figure 1 and showing a portion of the door frame with the keeper mounted thereon.
Figure 3:
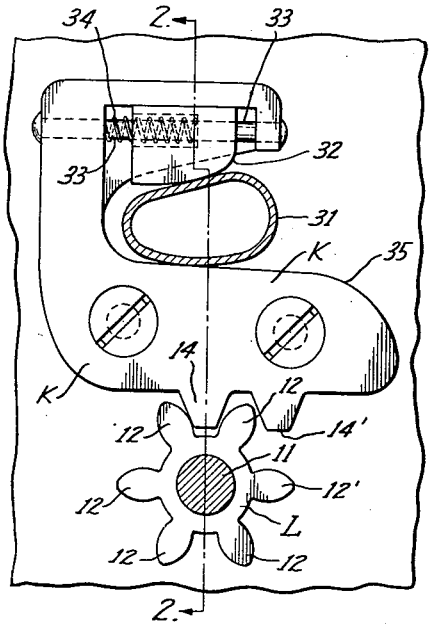
Figure 3 is a fragmentary vertical cross-sectional view taken substantially on line 3—3 of Figure 2 illustrating the relative positions of the latch member and keeper when the door is closed and latched.
Figure 4:
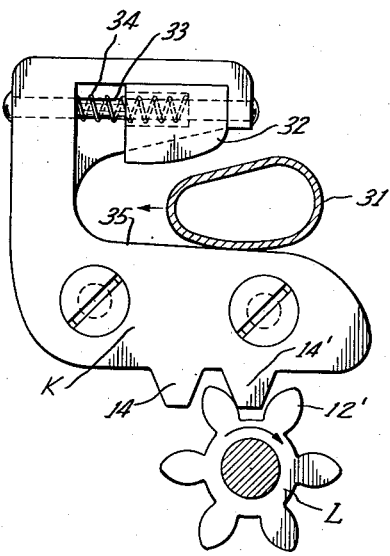
Figure 4 is a view similar to Figure 3 but showing the relative positions of the latch member and keeper when in secondary latched or "safety" position.
Figure 5:
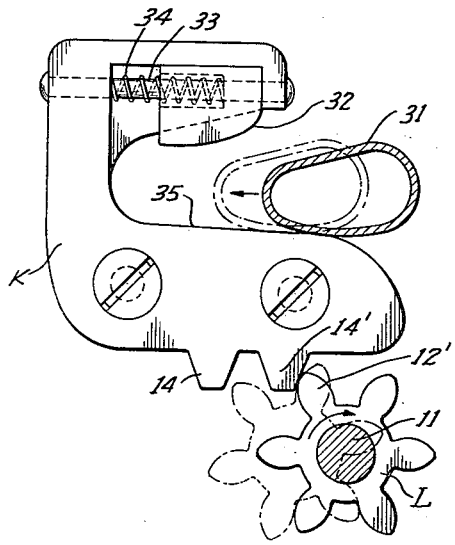
Figure 5 is a view similar to Figures 3 and 4 but showing the latch member in unlatched relation to the keeper.
Figure 6:
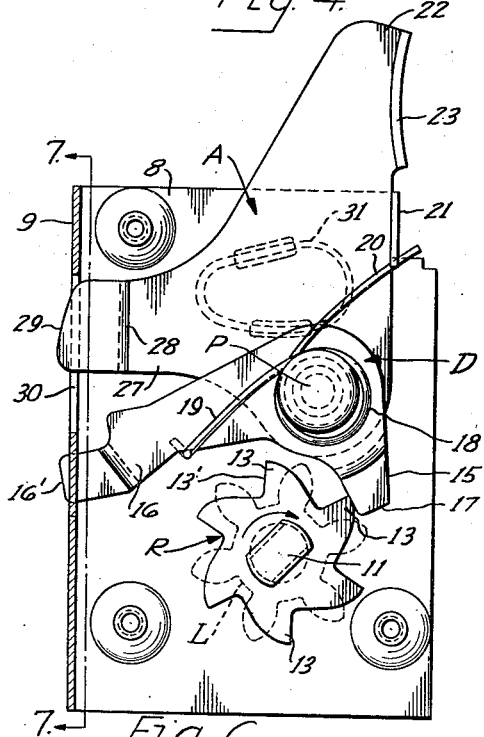

Figure 6 is a detached simplified view of the latch mechanism of Figures 1 and 2, looking toward the base portion of the frame or housing, in which certain parts are omitted for clearness and illustrating the movement imparted to the detent when the latch member moves either from the unlatched position of Figure 5 into the secondary latched position of Figure 4 or from the secondary latched position of Figure 4 into the full latched position of Figure 3.

Figure 7:
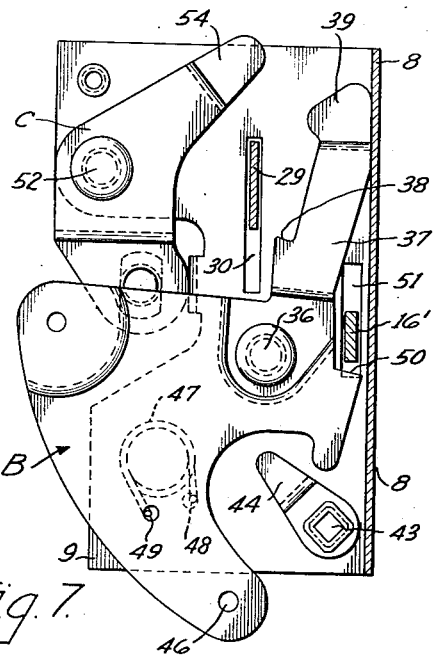

Figure 7 is an illustrative cross-sectional view taken substantially on line 7—7 of Figure 6 and including some of the parts which are omitted in Figure 6.

Figure 8:
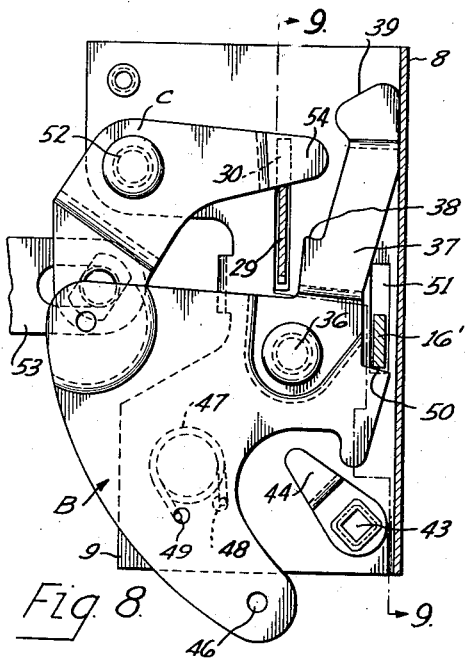
Figure 9:
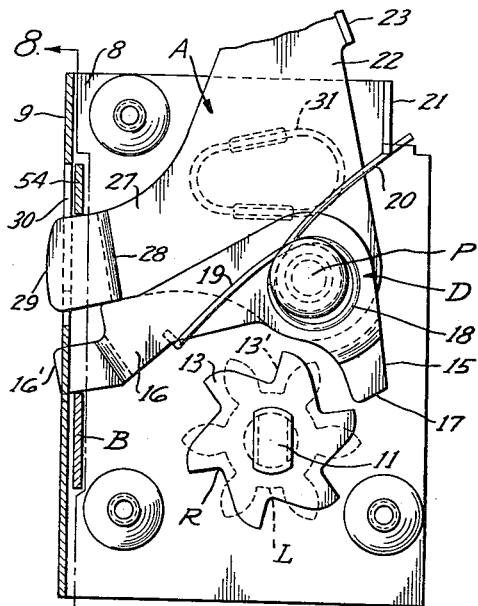

Figures 8 and 9 are views which correspond generally to Figures 7 and 6 respectively but which show the parts in the positions they assume when the remote control means has been actuated to unlock and unlatch the mechanism, Figure 8 being taken substantially on line 8—8 of Figure 9 and Figure 9 being taken substantially on line 9—9 of Figure 8.

Figure 10:
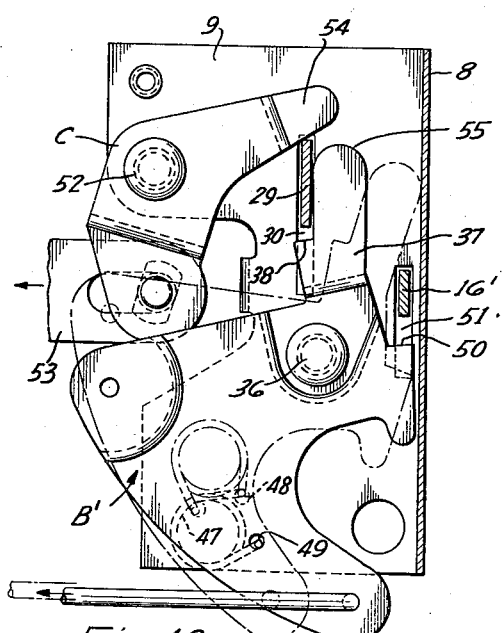

Figure 10 is a view generally similar to Figure 7 but showing a latch having a modified form of lock member whereby when the latch mechanism is locked it cannot be unlocked by actuation of the inside remote control.

Figure 11:
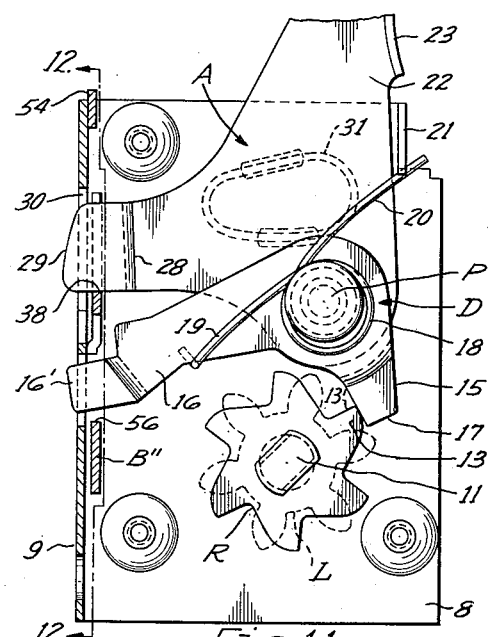
Figure 12:
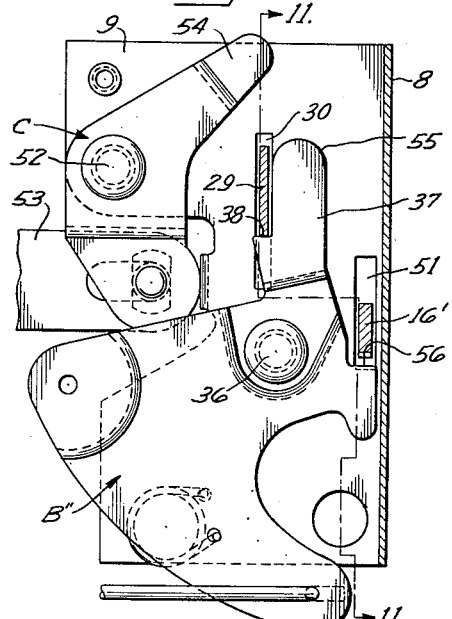

Figures 11 and 12 illustrate the latch mechanism of Figure 10 with a modified lock member whereby when the mechanism is locked with the door open it will remain locked upon closing the door, Figure 11 being taken substantially on line 11—11 of Figure 12 and Figure 12 being taken substantially on line 12—12 of Figure 11.

Figure 13:
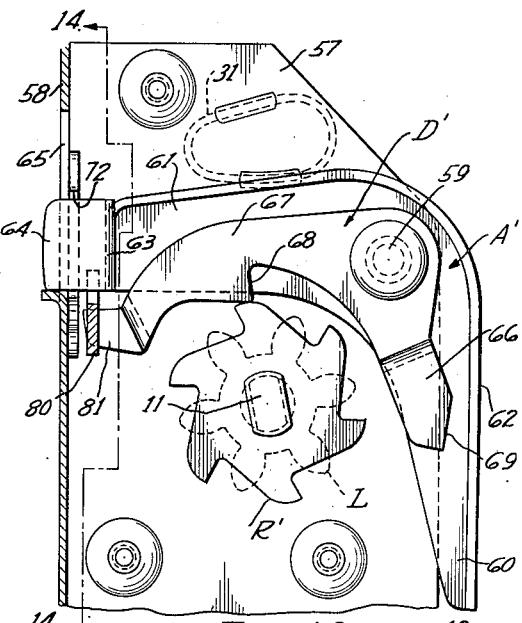

Figure 13 is a detached illustrative view of a modified type of latch mechanism in which the contactor extends downwardly as distinguished from the upwardly extending contactor of the previous views, the parts being shown in the positions they assume during movement of the latch from door open position to secondary latched position or from secondary latched position to full latched position.

Figure 14:
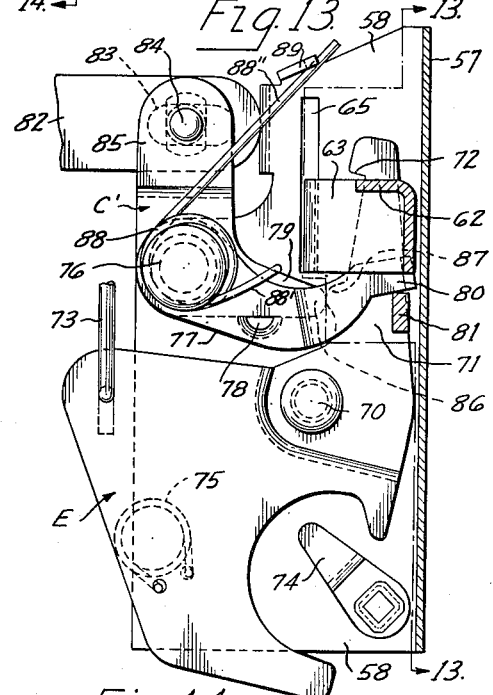

Figure 14 is a cross-sectional view taken substantially on line 14—14 of Figure 13.

Figure 15:
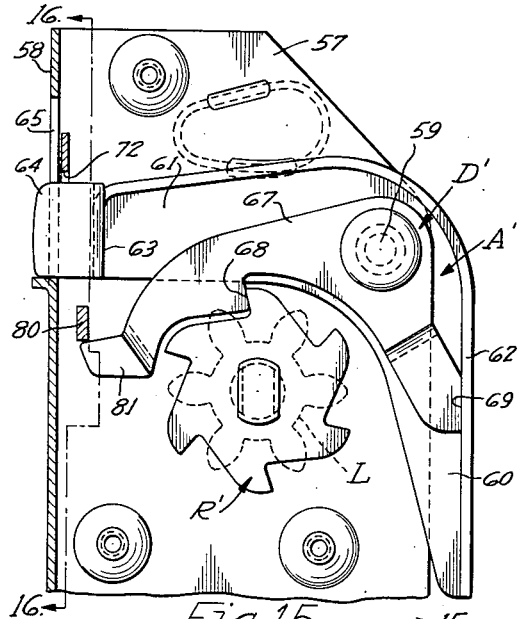
Figure 16:
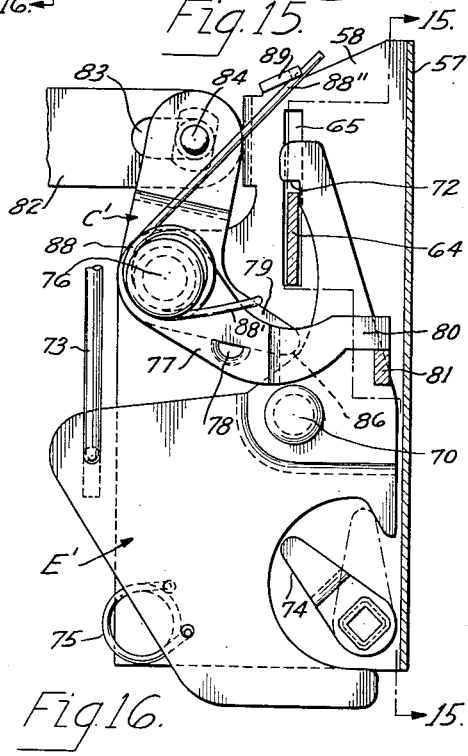

Figures 15 and 16 illustrate a latch mechanism of the general type shown in Figures 13 and 14 and are taken substantially on the section lines shown, the latch being illustrated in its normal non-operating position (latched or unlatched) and being provided with a modified lock member from that shown in Figures 13 and 14 whereby neither closing of the door nor operation of the inside remote control will unlock the lock member.

Figure 17:
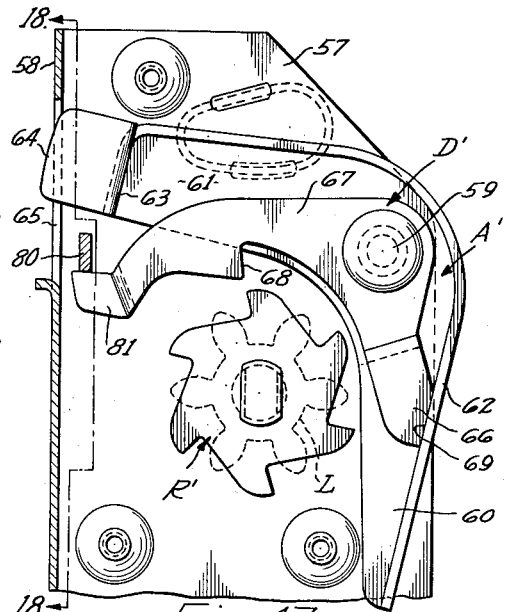
Figure 18:
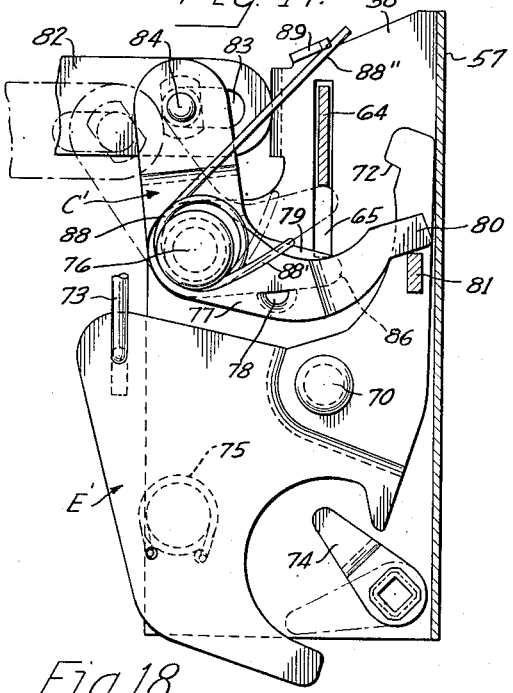

Figures 17 and 18 correspond to Figures 15 and 16 and illustrate the same mechanism but with the parts in their latch released positions.

Figure 19:
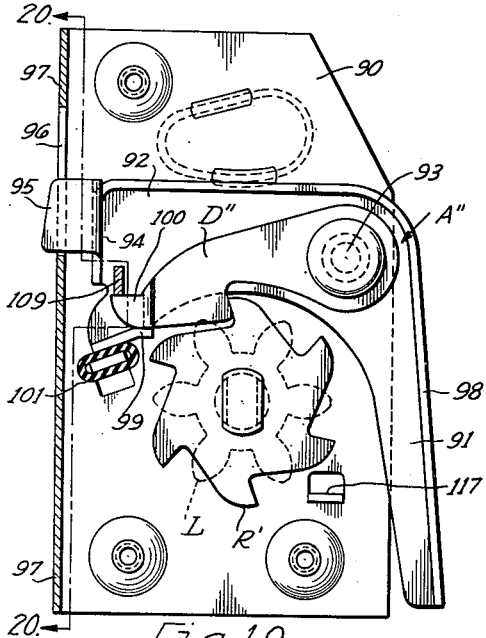

Figure 19 is an illustrative view, certain parts being omitted for clearness, taken in the same direction as Figure 6 but illustrating a modified form of contactor-down latch mechanism which will automatically unlock on closing but which cannot be unlocked by the inside remote control means.

Figure 20:
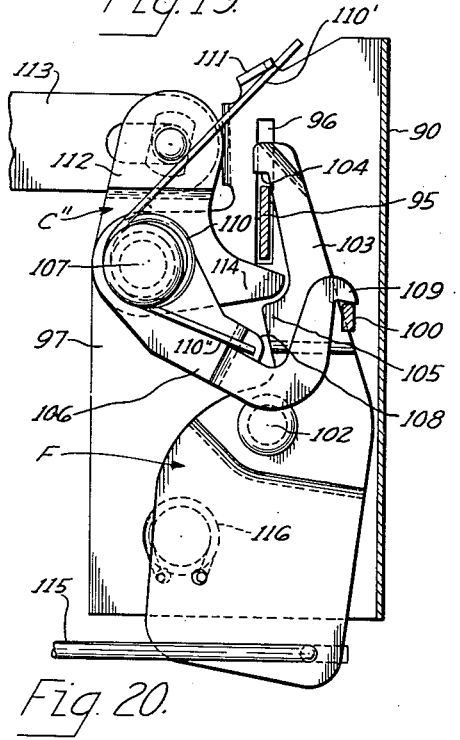

Figure 20 is a view taken substantially on line 20—20 of Figure 19, certain parts which are omitted in Figure 19 being illustrated in Figure 20.

Figure 21:
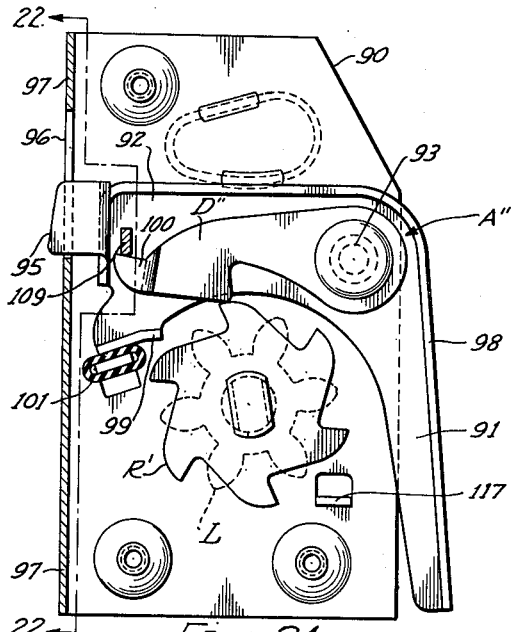
Figure 22:
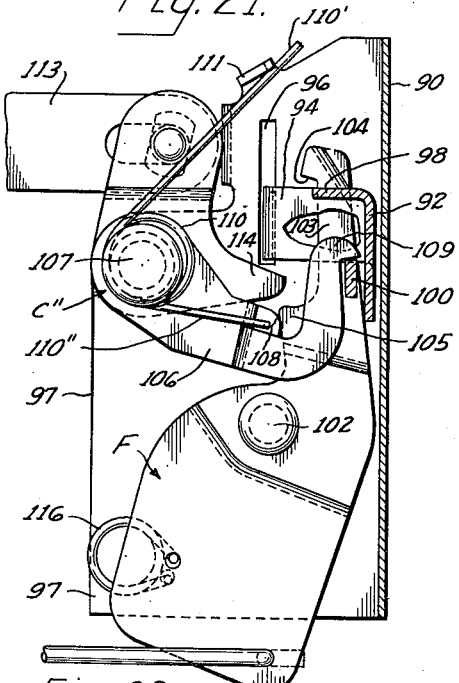

Figures 21 and 22 are views corresponding to Figures 19 and 20 but showing the parts of the mechanism in the positions they assume when the lock member has been locked with the door open and the latch member is substantially mid-way between unlatched and secondary latched positions during closing of the door.

Figure 23:
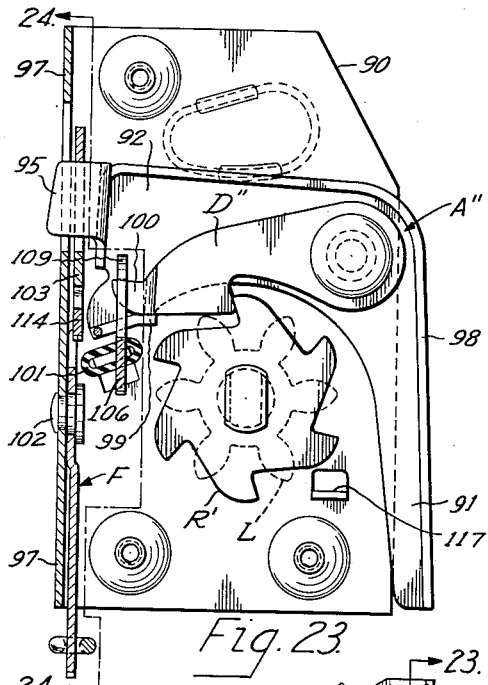
Figure 24:
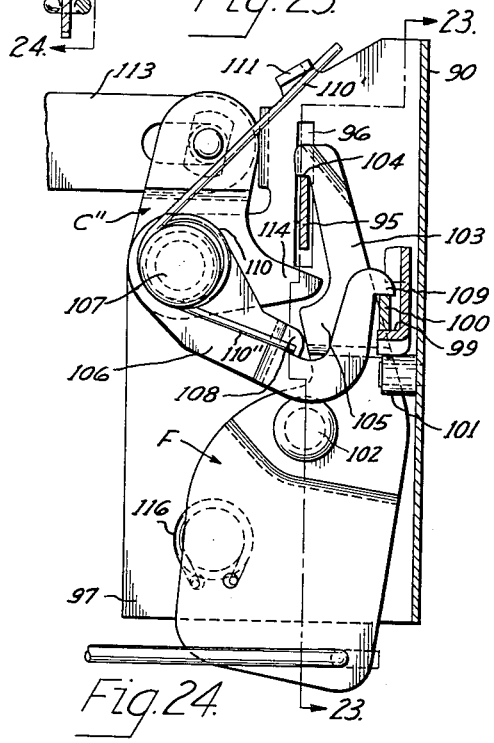

Figures 23 and 24 are views similar to Figures 19 and 20 but showing the positions the parts assume when an attempt is made to move the actuating lever into unlatched position from outside the door when the lock is locked.

Figure 25:
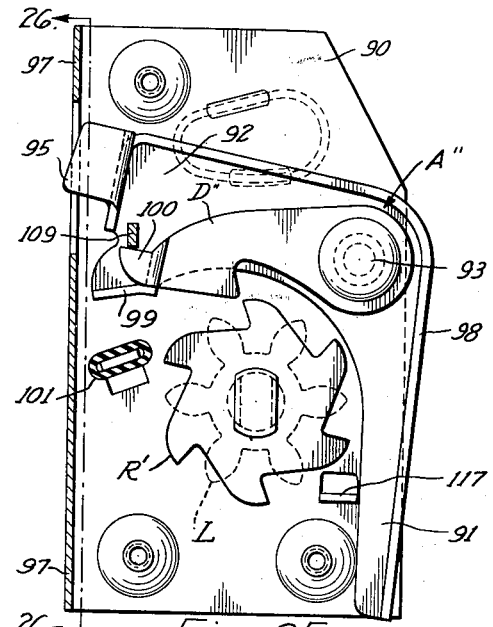
Figure 26:
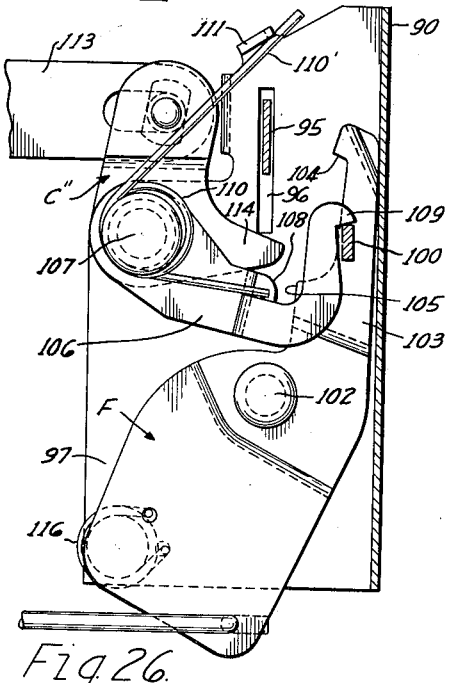

Figures 25 and 26 are views generally similar to Figures 24 and 24 but illustrating the parts in the positions they assume when the latch is unlocked and has been released for door opening by operating pressure on the actuating member.

In Figures 1 and 2 an automobile door of typical form is illustrated as having an outer door panel 1, an inner door panel 2 and a free edge wall 3. The garnish molding is seen at 4 and the glass 5 is supported in the usual glass run channel 6.

Mounted on the free edge wall 3 of the door by screws 7 is the frame structure or housing of my latch mechanism. This frame includes a base portion 8 and a side flange portion 9. The latch member L is rotatably supported on the base portion 8 of the frame structure and, when the mechanism is positioned on a door, it is disposed on the outside of the free edge wall 3 so that it may engage the keeper member K. As seen in Figure 2, keeper K is mounted on the body pillar portion 10 of the vehicle door frame. The latch member L has a shaft portion 11 having a suitable bearing in the base portion 8 and is provided with a plurality of identical radially extending teeth 12 which are equally spaced circumferentially around the latch member to form an element resembling a spur gear and which, accordingly, is sometimes referred to as a "gear" type latch member. Mounted on the inner end of shaft portion 11 is a ratchet element R having a plurality of spaced ratchet teeth 13, the number of teeth 13 being equal to the number of latch member teeth 12. As seen in Figures 1 and 2 the inner end of shaft 11 is flattened and riveted over to secure the ratchet element R for rotation with the latch member L.

As will be understood, when the door is fully closed and latched the teeth 12 of latch member L straddle the innermost tooth 14 on the keeper K (see Figure 3). A detent member D is pivotally mounted on a pin P carried by the base plate 8 and includes a downwardly extending arm portion 15 and a transversely extending arm portion 16. When the latch blocking face 17 of arm portion 15 is in engagement with the generally radially extending face portion 13' of one of the ratchet teeth 13, as seen in Figure 1, movement of the latch member in door unlatching direction (counterclockwise as seen in Figure 1) is prevented. In order that detent D may at all times be urged toward its latch holding or blocking position a spring 18 is mounted on the headed pivot pin P with one end portion 19 engaging the transverse arm 16 of detent D and the other end portion 20 anchored against a flange 21 on base plate 8.

Concentrically mounted on pivot pin P for movement independently of the detent D is an actuating lever generally indicated at A. The upwardly extending arm portion 22 of actuating lever A has a flange 23 disposed to be engaged by the plunger 24 carried by push button 25 which in turn is suitably supported on the outer door panel 1. It will be observed that, when the door is closed and latched, pressure on push button 25 will exert an operating force on the actuating lever A, and that the spring 26 will return push button 25 to its normal nonoperating position seen in Figure 1 upon release of pressure thereagainst. Actuating lever A also includes a transversely extending arm portion 27 which is offset inwardly at 28 as seen in Figures 1 and 2 and has an end portion 29 projecting through and movable in a slot 30 formed in the side flange 9.

It will be observed from Figure 1 that the offset portion 28 of actuating lever A lies above the transverse arm 16 of detent D. Movement of the lever A in clockwise direction (Figure 1) is limited by engagement of the upper portion 22 with the flange 21. Actuating lever A is held in this non-operating position by the spring 18 acting against the transverse arm 16 of detent D, causing arm 16 to engage the offset 28 of actuating lever A and move the lever about its pivotal support into its non-operating position. Inward pressure on the push button 25, when the parts are in the position seen in Figure 1, will cause counterclockwise movement of actuating lever A and, due to the direct engagement between offset portion 28 of lever A and transverse arm 16 of detent D, will also move the detent D in disengaging (counterclockwise) direction, causing blocking portion 17 to move out of blocking engagement with a ratchet tooth 13 and permit free door opening rotation of the ratchet element R and latch member L (counterclockwise in Figure 1). It will be seen from the above description that actuating means are provided which include an actuating lever A and a detent member D connected thereto in such a manner that when the actuating lever is moved into latch releasing position the detent member is moved into latch released position.

When pressure is released from the push button 25, after the door has been opened, the spring 18 will return the detent D and actuating lever A to the positions seen in Figure 1 with the blocking face 17 of detent D again in blocking relation to one of the teeth 13 of ratchet R. If the door is now closed the upper tooth of latch member L which is indicated at 12' in Figure 5 will first strike the outer keeper tooth 14' as seen in Figure 5 and the keeper L will rotate in clockwise direction causing corresponding rotation of the ratchet element R. This rotation of ratchet element R will cause the lower arm portion 15 of detent D to ride up on the inclined surface of the adjacent ratchet tooth 13 with accompanying downward movement of the transverse arm portion 16 into the position seen in Figure 6. Such movement of detent D will be resisted by spring 18 but will be independent of the actuating lever A which is supported for independent rotation on pin P. When the latch member L has rotated through 60° (when six teeth are employed) the outer keeper tooth 14' will be disposed between the two top teeth of the latch member L as seen in Figure 4 and the detent D will have been moved back down into blocking position (as seen in Figure 1) relative with the next ratchet tooth 13. This is the secondary or "safety" position in which the door is not fully closed. Further movement of the door in closing direction will cause the latch member L to rotate through another 60° into the position seen in Figure 3 which is the door closed and full latched position seen in Figures 1 and 2.

To prevent vertical movement of the door when in closed and latched position, a tapered blocking member 31 is mounted on the base plate 8 of the frame structure in vertically spaced relation to the latch member L. When assembled on a door this blocking member 31 projects out from the face of the free edge wall 3 of the door and is adapted to engage a sliding wedge 32 which is mounted on a transverse rod 33 (see Figs. 2 to 5) and urged outwardly by a spring 34. As the door moves into closed position the blocking member 31 engages wedge 32 moving it inwardly until the door reaches closed position. The angle of engagement of blocking member 31 and wedge 32 is such that vertical force between these elements will not cause horizontal sliding movement of the wedge 32, thus preventing upward movement of the door relative to the door frame. The underside of blocking member 31 has sliding engagement with the top face 35 of the keeper member K and this engagement prevents downward movement of the door when in latched position.

From the above explanation of the portion of my latch mechanism thus far described it will be seen that with a symmetrically toothed latch member, which is mounted for free rotation when released for door opening movement, means must be provided for permitting the detent, which holds the latch member against unlatching rotation, to be moved out of its latch blocking position upon rotation of the latch member in latching direction and that the detent must have the same degree of movement when the door moves from open to secondary latched position as it has when the door moves from secondary to full latched position. Furthermore, all of the latch mechanism parts thus far described have identical positions when the door is (a) open, (b) in secondary or safety latched position and (c) in full latched position. These inherent features of a gear or rotary type latch require special consideration when it is desired to provide locking and inside remote control means whereby any one of four sets of operating characteristics, as set forth above in the statement of the objects of the present invention, may be obtained.

The apparatus of Figures 1 to 9 provides a door control mechanism of the gear type in which the lock member, if the door is open, will automatically be moved into unlocked position upon closing the door into its secondary or safety latched position, and in which operation of the inside remote control means will unlock the lock member if it is in locked position and will then, by further movement, unlatch the latch member. As clearly seen in Figure 2, the lock member B is pivotally supported on a pin 36 carried by the side flange 9. The upwardly extending arm portion 37 of lock member B has a blocking abutment 38 which, when the lock member B is disposed in locking position as seen in Figure 2, is located below the end portion 29 of actuating lever A and prevents downward movement thereof in detent operating direction. The upper end of arm portion 37 is provided with a cam face 39, the purpose of which will be later described, and the downwardly extending portion 40 of lock member B is connected to the operating rod 41 which extends upwardly through the garnish molding 4 and is provided with an operating knob 42 at its upper end.

As noted above the locked position of member B is seen in Figure 2 and the unlocked position is seen in Figure 7. Movement of lock member B from locked position into unlocked position may be effected by lifting the knob 42, from the full line to the phantom line position of Figures 1 and 2, to swing the member B clockwise (Figure 2) on its pivotal support 36 until the upper arm portion 37 strikes the base plate 8 of the frame structure (Figure 7). Alternatively, the locking member B may be actuated by an outside key controlled lock mechanism, generally indicated at M, which is operatively connected by a square shaft 43 to an arm 44 pivotally mounted on the side flange 9. When rotated by means of the key M' shaft 43 will cause the end of arm 44 to engage the cut out portion 45 of lock member B to move it into locked or unlocked position as the case may be. The lock mechanism M is so arranged that the key M' can only be removed when the arm 44 is in its center or neutral position seen in Figure 2. The clearance provided by the cut out portion 45 of member B is such that regardless of whether the lock member B is set in locked or unlocked position by the knob 42 it can be moved into the other position by the key M', and vice versa. A hole 46 at the bottom end of downwardly extending portion 40 of lock member B provides means for connecting a remote lock operating control when it is desired to have the garnish molding button spaced from the free edge of the door.

In order to hold the lock member B in either its locked or unlocked position a snap-over spring 47 is mounted between the portion 40 of lock member B and the side flange 9 of the frame structure. One end, 48, of snap-over spring 47 is secured to the side flange 9 while the other end 49 is disposed in a suitable hole in the downwardly extending arm portion 40. The snap-over spring 47 is so arranged that when the lock member B is in unlocked position, as seen in Figure 7, it will tend to retain it in this position but will snap over substantially midway between unlocked and locked position so that it will tend to maintain lock member B in locked position when placed therein.

As is best seen in Figures 7 and 8, lock member B is formed with a shoulder 50 which extends toward the base plate 8 and overlies a slot 51 in the side flange 9. The outer end portion 16' of the transversely extending arm portion 16 of detent D extends through and is movable in the slot 51. When the mechanism is in latched and locked position, as seen in Figures 1 and 2, the lower edge of end portion 16' of detent D lies above and in spaced relation to the abutment 50. This is the position the parts would assume if the lock member B were placed in locked position with the door open. Upon closing the door after having locked the latch when in open position, the latch member L will be rotated in latching direction (clockwise in Figures 3, 4 and 5) with corresponding rotation of the ratchet member R.

This rotation of ratchet member R will cam the arm portion 15 of detent D outwardly into the position seen in Figure 6 with corresponding downward movement of the transverse arm portion 16 of detent D. During downward movement of transverse arm 16 the end portion 16' will engage the abutment 50 of lock member B and move it downwardly causing the lock member B to swing about its pivotal support 36 in unlocking direction (clockwise from the position seen in Figure 2 into that seen in Figure 7) a distance sufficient to effect snap-over action of spring 47. Thus the lock member B will be automatically unlocked when the door is moved from its open into secondary latched position. This action will take place regardless of whether the lock member B has been placed in locked position by the garnish molding knob 42 or by the outside key M' and accordingly, with this arrangement, it is impossible for the operator to leave his key in the vehicle and lock himself out.

It is desirable, particularly in front door installations, to provide an inside remote control means for releasing the latch mechanism which will be effective to unlatch the door for opening regardless of whether it has been previously locked by the garnish molding knob or the key. In the embodiment shown in Figures 1–9 a remote control bell crank lever C is pivotally mounted on the side flange 9 by a pin 52, the lower end of bell crank C being operatively connected to the remote control strap 53 which extends to the usual inside handle or push button (not shown). The upper end portion 54 of bell crank C overlies the cam face 39 of lock member B when same is in locked position. This is clearly seen in Figure 2 and it will be observed that, if a pull is exerted on strap 53 by the remote control handle or push button, bell crank C will move in clockwise direction and the end portion 54 will engage cam face 39 moving lock member B in unlocking direction beyond the snap-over point of spring 47 whereupon the blocking abutment 38 will be moved out of the path of travel of the end 29 of actuating lever A and into the unlocked position of Figure 8. Further clockwise movement of bell crank C will cause end portion 54 to engage the end portion 29 of the actuating lever A moving it downwardly into the position seen in Figures 8 and 9 with concurrent movement of the detent D into latch released position as seen in Figure 9.

From the above description it will be understood that the apparatus illustrated in Figures 1–9 provides a gear type latch mechanism whereby the lock member, if locked when the door is open, will automatically be moved into unlocked position upon closing the door, and whereby operation of the inside remote control means in latch releasing direction will unlock the lock member, if it is in locked position, and then subsequently, and by further movement, unlatch the door.

Figure 10 illustrates a latch mechanism similar to that previously described but in which the lock member B' is modified by the omission of the cam face 39 on the upwardly extending arm 37. This arm 37 is cut off as seen at 55 and accordingly the upper end 54 of bell crank C will not engage the lock member B' to move same out of locked position. This is illustrated by Figure 10 in which lock member B' is in locked position, end portion 29 of actuating lever A is in its upper or non-operating position and bell crank C has been moved in latch releasing direction until it just engages end portion 29. Further movement of bell crank C in unlatching direction is only possible until end portion 29 strikes blocking abutment 38 of lock member B' and thus, with this embodiment, actuation of the remote control lever C will not unlock the lock member and the latch cannot be released by the inside remote control. The arrangement of the shoulder 50 on lock member B' and its relation to the end portion 16' of detent D is the same as that of Figures 1–9 and accordingly the apparatus of Figure 10 provides a gear type latch mechanism whereby the lock member, if locked when the door is open, will automatically be moved into unlocked position upon closing the door, and whereby operation of the inside remote control means will not unlock the lock member if it is in locked position.

The mechanism of Figures 11 and 12 is the same as that shown in Figure 10 except that the lock member B" is cut away at 56 so that the end 16' of detent D will not strike the lock member B" during closing movement of the door and thus if the lock member B" is moved into locked position with the door open, and the door then closed, the lock member B" will remain in locked position. This is evident from Figures 11 and 12 in which the end portion 16' of detent D has been moved to the lowest point it reaches during door closing and has not engaged lock member B" to cause unlocking movement thereof. The mechanism of Figures 11 and 12 provides a gear type latch mechanism whereby the lock member, if locked when the door is open, will remain locked upon closing the door, and operation of the inside remote control means will not unlock the lock member.

If it is desired to provide a latch mechanism whereby the lock member, if locked when the door is open, will remain locked upon closing the door, and operation of the inside remote control means will unlock the lock member, this may be accomplished by substituting in Figure 12 for the lock member B" a lock member which is identical with B" except that it includes the cam face 39 on the upwardly extending arm portion as seen on lock member B of Figure 2.

It has been demonstrated above that by minor changes in the form of a single part of my improved door control mechanism, which changes do not substantially affect the cost of the part or of the assembly, door control mechanisms may be provided which have four different types of operating characteristics. In some installations one type of operating characteristic is most desirable while other installations may require other characteristics. The provision of a latch mechanism of the rotary or gear type which permits any of the various operating characteristics to be secured has not, so far as I am aware, been accomplished prior to my present invention.

Several modifications of a different form of door control mechanism are shown in Figures 13–18. These embodiments are of the contactor-down type and are advantageously used where the body design requires the outside push putton to be on the opposite side of the axis of the latch member from the devices of Figures 1–12. Figures 13 and 14 illustrate a door control mechanism of the rotary or gear type whereby the lock member, if locked when the door is open, will automatically be moved into unlocked position on closing the door, and operation of the inside remote control means in latch releasing direction will unlock the lock member if it is in locked position. In this mechanism the frame structure includes a base plate portion 57 and a side flange 58. Latch member L may be substantially identical with that previously described and ratchet element R' is slightly different in form but performs the same function as ratchet element R. The actuating lever A' is pivotally mounted on base plate 57 by a pivot pin 59 and has a downwardly extending arm portion 60 and a transverse arm portion 61. A flange 62 extends around the outer edge of actuating lever A' and the transverse arm portion 61 is offset at 63 so that the end portion 64 projects through and is movable in slot 65 in the side flange 58. Also pivotally supported on pivot pin 59, for movement independently of actuating lever A', is a detent member D' which includes a downwardly extending arm portion 66 and a transverse arm portion 67. A hook type latch blocking face 68 is formed on transverse arm 67 and the edge portion 69 of downwardly extending arm 66 is shaped to be engaged by the flange 62 on arm 60 of actuating lever A' (see Figure 15 which along with Figures 16–18 illustrate modified forms but are the same as Figures 13 and 14 in respect to the actuating lever A and detent D').

A lock member E is pivotally mounted on side flange 58 by a pin 70 and has an upwardly extending arm portion 71 provided at its upper end with a blocking abutment 72 which, when the lock member E is in locked position (see lock member E' in Figure 16), is disposed in the path of movement of the end portion 64 of actuating lever A' preventing latch releasing movement thereof. Operation of the lock member E is effected through a garnish molding knob connected to rod 73 or a key actuated lock connected to lever 74 in the same manner as previously described, and the snap-over spring 75 functions in the same manner as snap-over spring 47.

The remote control bell crank lever C' is pivotally mounted on a headed pin 76 carried by the side flange 58 and an auxiliary remote control arm 77 is also pivotally mounted on pin 76 adjacent to bell crank C'. A struck-out portion 78 on auxiliary arm 77 is adapted to engage the lower edge of the bottom arm portion 79 of bell crank C' to effect an operating connection therebetween and the outer end 80 of auxiliary arm 77 overlies and is adapted to be engaged by the outer end portion 81 of transverse arm 67 of detent D'.

To operate the remote control bell crank C' I provide a strap 82 which leads to a suitable inside remote control push button or handle (not shown). This strap is formed with a slot 83 in its end portion through which a pin 84, carried by the upper end 85 of bell crank C', extends. This pin and slot provides a certain degree of lost motion as will be later referred to. The outer rounded end portion 86 of the lower arm 79 of bell crank C' is adapted to engage a projecting cam portion 87 on the upper arm 71 of lock member E (see Figure 14) and the spring 88 has its lower end 88' operatively engaging the lower arm 79 of bell crank C' and its upper end 88" anchored against a tang 89 on side flange 58. This spring 88 tends at all times to urge bell crank C' and auxiliary arm 77 toward their normal non-operating positions (clockwise as seen in Figures 14, 16 and 18). As the arm 79 of bell crank C' engages the struck-out portion 78 on auxiliary arm 77, and as the end 80 of arm 77 engages the end 81 of detent D' and urges same at all times in a downwardly direction, the single spring 88 not only holds the remote control bell crank and auxiliary arm in their proper normal non-operating positions but also at all times urges the detent D' toward holding engagement with the ratchet element R'.

The operation of the apparatus of Figures 13 and 14 will now be explained, reference also being made to Figures 15–18 which illustrate a latch mechanism identical to that of Figures 13 and 14 except for omission of the cam portion 87 on the lock member. Figures 15 and 16 illustrate the actuating lever A', detent D', and ratchet element R' in the positions they assume when the door is open, in secondary latched position, or in fully closed and latched position. To release the latch, pressure is exerted on the actuating lever A' by suitable means, such as a push button on the outside of the door, causing clockwise rotation thereof into the position seen in Figure 17, provided of course the lock member is in unlocked position. Due to the engagement of flange 62 with face 69 of detent D', the detent D' moves with actuating lever A' into latch released position as seen in Figure 17.

Referring now particularly to the mechanism of Figures 13 and 14, when the parts are in their normal non-operating positions (corresponding to those shown in Figures 15 and 16) the rounded end 86 of the bottom arm 79 of remote control bell crank C' is disposed directly below the cam portion 87 on lock member E when the lock member is in locked position (corresponding to the position of lock member E' in Figure 16). A pull on the remote control strap 82 will move the bell crank C' in counterclockwise direction so that the rounded end 86 thereof will engage the cam portion 87 moving the lock member E from locked position in unlocking direction to the position seen in Figure 14 where the snapover spring 75 has crossed dead center and will continue to move lock member E into full unlocked position (see position of lock member E' in Figure 18). Further counterclockwise movement of the bell crank C' will lift the end portion 64 of actuating arm A' causing corresponding lifting of the blocking face 68 of detent D' out of blocking position relative to the teeth of the ratchet element R', thus permitting the door to be opened.

If the lock member E has been moved into its locked position with the door open and the door is then closed the ratchet element R' will be rotated in latching direction (clockwise) and will cam the transverse arm portion 67 of detent D' upwardly into the position seen in Figure 13. During this upward movement of the arm 67 its end portion 81 will engage the outer end 80 of the auxiliary arm 77 moving same counterclockwise about its pivotal center 76. This movement of auxiliary arm 77 will cause corresponding counterclockwise movement of bell crank C' from the position seen in Figure 16 into that seen in Figure 14 with resulting camming action by rounded end 86 of bell crank C' on the cam portion 87 of lock member E. This camming action will move lock member E into unlocked position as previously described. From the above description it will be understood that the apparatus of Figures 13 and 14 comprises a contactor-down type door mechanism having a rotary or gear type latch member whereby the lock member, if locked when the door is open, will automatically be unlocked upon closing the door, and whereby operation of the inside remote control means will first unlock the lock member, if it is locked, and then unlatch the latch mechanism.

Figures 15–18, which have been referred to above in describing the operation of the mechanism of Figures 13 and 14, illustrate a modification of the latch of Figures 13 and 14 whereby, if the latch is locked with the door open, closing the door will not unlock same and operation of the remote control mechanism will not unlock the mechanism when it is locked. This change in operating characteristics is effected by elimination of the cam portion 87 of lock member E to form the lock member E' of Figures 15–18. By eliminating this cam portion 87 upward movement of the rounded end 86 of lower arm 79 of bell crank C', whether caused by slamming the door after the lock has been locked with the door open or by actuation of remote control bell crank C' by strap 82, will not act upon the lock member E' and the lock member will remain locked to prevent releasing movement of the actuating lever A' and detent D'.

Thus Figures 13 and 14 illustrate a contactor-down door control mechanism which corresponds in operating characteristics to that of the contactor-up door control mechanism of Figures 1–9 while Figures 15–18 illustrate a contactor-down door control mechanism which corresponds in operating characteristics to that of the contactor-up door control mechanism of Figures 11 and 12.

Figures 19–26 illustrate an embodiment of a contactor-down latch mechanism which corresponds in operating characteristics to the apparatus shown in Figure 10, i. e., if the mechanism is locked with the door open, it will automatically be unlocked upon closing the door, but operation of the inside remote control will not unlock the lock member. In these views, latch member L is pivotally mounted on the outside of the base plate 90 and the ratchet element R' is supported on the inside of the base plate 90 for rotation with latch member L. Actuating lever A" is of the contactor-down type and generally similar in its form and mode of operation to actuating lever A' of Figure 13. It includes a downwardly extending arm portion 91 and a transverse arm portion 92. The pivot pin 93 is carried by the base plate 90 and, in addition to pivotally supporting the actuating lever A", it pivotally supports the detent member D".

The transverse arm 92 of actuating lever A" is offset at 94 (see Figure 22) and has an end portion 95 which extends through and is movable in a slot 96 in the side flange 97 of the frame structure. A peripheral flange 98 extends around the outside edge of actuating lever A" and serves to stiffen this unit and also provides an abutment against which the outside push button plunger (not shown) may operate. As is perhaps best seen in Figures 23 and 24, an inturned flange 99 is formed at the outer lower edge of the transverse arm 92 of actuating lever A". This flange 99 is disposed below and operatively engages the outer end 100 of detent D" and thus clockwise movement of actuating lever A" will impart corresponding clockwise movement to detent D" with consequent release of the latch member L. In order to provide a cushion stop to limit movement of actuating lever A" and detent D" in latching direction, a projecting bumper 101 is secured to the base plate 90 and preferably provided with a resilient covering of rubber or the like as illustrated.

The lock member F of the mechanism of Figures 19–26 is pivotally mounted on the side flange 97 at 102 and has an upwardly extending arm portion 103 formed with an actuating lever blocking abutment 104 which is generally similar to, and performs the same function as, blocking abutment 72 on the lock member E of Figure 14. To provide automatic unlocking upon closing the door, a cam portion 105 is formed on upper arm 103 of lock member F between the abutment 104 and the pivot 102. Automatic unlocking is effected through an auxiliary arm 106 which is pivotally supported on a pin 107 carried by the side flange 97 and includes a rounded cam engaging face 108 and a hook portion 109 which overlies and is adapted to be engaged by the end portion 100 of detent D". The spring 110 is carried by the headed pivot pin 107 and has its upper end 110' anchored against a flange 111 on side flange 97 and its lower end 110" operatively engaging the auxiliary arm 106 to urge same in clockwise direction (Figure 20).

The action of spring 110 is transmitted by the hook portion 109 of auxiliary arm 106 to the end 100 of detent D" and thus spring 107 tends at all times to maintain detent D" in latch holding position as seen in Figure 19. Through the engagement of end portion 100 of detent D" with flange 99 on actuating lever A" the spring 110 also tends to maintain lever A" in the normal non-operating position of Figure 19.

In addition to providing a pivotal support for auxiliary arm 106, pivot pin 107 pivotally supports the remote control bell crank lever C" which has an upper arm 112 operatively connected to the remote control strap 113 and a lower arm portion 114 which, as clearly seen in Figure 20, extends below the slot 96 and the end 95 of actuating lever A" and above the cam portion 105 of lock member F.

Figures 19 and 20 illustrate the mechanism just described in its locked position. For purposes of the immediately following explanation it may be assumed that in Figures 19 and 20 the vehicle door is open and the lock member F has been moved into locked position by the rod 115 which is connected by suitable linkage to a garnish molding knob (not shown). If the door is now closed movement of the latch member L toward secondary latched position upon engagement with the keeper will rotate the ratchet element R' in clockwise direction with consequent lifting of the detent D" into the position seen in Figures 21 and 22. During this movement of detent D" its end portion 100 will engage the hook 109 on auxiliary arm 106 and will lift same from the position of Figure 20 into that of Figure 22. During this movement the rounded cam engaging face 108 of arm 106 will engage cam 105 on lock member F swinging same in unlocking direction (clockwise in Figures 20 and 22) until the snap-over spring 116 reverses its action and moves the lock member into full unlocked position as seen in Figure 26. During this automatic unlocking upon closing the door the remote control bell crank C" and the actuating lever A" remain in their normal non-operating positions seen in Figures 21 and 22.

If the door is closed, latched and locked the parts of the mechanism will also be as seen in Figures 19 and 20. If an attempt is now made to open the door by a pull on the inside remote control strap 113 the result will merely be a slight movement of remote control bell crank C" with engagement of the lower arm 114 with the end 95 of the actuating lever A". This movement will be blocked, however, by the abutment 104 on lock member F and thus, if the lock member is in locked position, the mechanism cannot be unlocked by actuation of the inside remote control.

Figures 23 and 24 illustrate the result of an attempt to open the door from outside the vehicle when it is closed and locked. A slight inward movement has been imparted to the lower arm 91 of actuating lever A" with corresponding lifting movement of transverse arm 92 and end portion 95 thereof. However, the end 95 has engaged and been blocked by the abutment 104 on lock member F and consequently the door cannot be opened. It will also be noted that the rounded cam engaging face 108 of the auxiliary arm 106 has not engaged cam portion 105 of lock member F to effect unlocking thereof.

Figures 25 and 26 illustrate the mechanism in unlocked and latch released position after latch releasing operation of the actuating lever A". The lower arm 91 of the actuating lever has been moved inwardly until its inner edge strikes a stop flange 117 struck out from base plate 90 and, through the engagement of inturned flange 99 with the end 100 of detent D", the detent has been moved completely out of engagement with ratchet element R' thus permitting door opening rotation of latch member L. Upward movement of detent D" has been accompanied by corresponding upward movement of auxiliary arm 106 but this movement of arm 106 has had no operating effect as arm 106 is movable independently of bell crank C" and face 108 does not engage the unlocked lock member F.

It will be understood from the above description that the mechanism of Figures 19–26 provides door control means whereby if the door is locked when in open position it will automatically be unlocked upon closing the door and whereby, when the door is closed and locked, it cannot be unlocked by operation of the inside remote control means. This mechanism is designed particularly for rear door installations, the key controlled lock operating means accordingly being omitted.

By means of the modifications of my improved door control mechanism which are illustrated and described herein an apparatus can be provided which will obtain various different operating characteristics as desired on either a front or a rear door installation. Although I have described the illustrated embodiments of my invention in considerable detail it will be understood by those skilled in the art that variations and modifications may be made in the form and arrangement of the parts making up my improved door control apparatus without departing from the spirit of my invention. I do not therefore wish to be limited to the exact structures herein shown and described but claim as my invention all embodiments thereof coming within the scope of the appended claims.

I claim:

1. In a door control mechanism having a frame structure, a latch member rotatably supported on said frame structure and having a plurality of equally spaced symmetrically arranged radially extending teeth, and a ratchet element rotatable with said latch member and having a plurality of equally spaced symmetrically arranged radially extending teeth; a detent member pivotally supported on said frame for movement between a latch blocking and a latch released position and having a latch blocking portion adapted when said detent member is in said latch blocking position to engage a tooth of said ratchet element to prevent rotation of said ratchet element and latch member in unlatching direction, an actuating lever pivotally mounted on said frame for movement from a non-operating position to a latch releasing position and return, means for interconnecting said actuating lever and said detent member whereby movement of said actuating lever from said non-operating position to said latch releasing position will effect movement of said detent member from its said latch blocking to its said latch released position, said detent member being movable in unlatching direction independently of said actuating lever, a lock member mounted on said frame for movement into and out of a locking position, said lock member having a portion disposed to engage and prevent movement of said actuating lever into said latch releasing position when said lock member is in said locking position, and a remote control lever pivotally mounted on said frame for movement between a non-operating position and a latch releasing position, said remote control lever having a portion adapted directly to engage said actuating lever and move same from said non-operating position to said latch releasing position, and said lock member having a portion disposed to be engaged by said remote control lever when said lock member is in locking position prior to engagement of said actuating lever by said remote control lever during movement of said remote control lever from non-operating to latch releasing position whereby, when said lock member is in locking position, said lock member will be unlocked by said remote control lever before said actuating lever is moved into latch releasing position.

2. In a door control mechanism having a frame structure, a latch member rotatably supported on said frame structure and having a plurality of equally spaced symmetrically arranged radially extending teeth, and a ratchet element rotatable with said latch member and having a plurality of equally spaced symmetrically arranged radially extending teeth; a detent member pivotally supported on said frame for movement between a latch blocking and a latch released position and having a latch blocking portion adapted when said detent member is in said latch blocking position to engage a tooth of said ratchet element to prevent rotation of said ratchet element and latch member in unlatching direction, an actuating lever pivotally mounted on said frame for movement from a non-operating position to a latch releasing position and return, means for interconnecting said actuating lever and said detent member whereby movement of said actuating lever from said non-operating position to said latch releasing position will effect movement of said detent member from its said latch blocking to its said latch released position, said detent member being movable in unlatching direction independently of said actuating lever, a lock member mounted on said frame for movement between unlocked and locking positions, said lock member having a portion disposed to engage and prevent movement of said actuating lever into said latch releasing position when said lock member is in said locking position, said lock member when in locking position having a portion disposed in the path of travel of and adapted to be engaged by said detent member during its movement from latch blocking to latch released position, whereby said lock member will be shifted from locking to unlocked position when said detent member moves from latch blocking to latch released position, and a remote control lever pivotally mounted on said frame for movement between a non-operating position and a latch releasing position, said remote control lever having a portion adapted directly to engage said actuating lever and move same from said non-operating position to said latch releasing position, and said lock member having a portion disposed to be engaged by said remote control lever when said lock member is in locking position prior to engagement of said actuating lever by said remote control lever during movement of said remote control lever from non-operating to latch releasing position whereby, when said lock member is in locking position, said lock member will be unlocked by said remote control lever before said actuating lever is moved into latch releasing position.

3. Door control mechanism including, a frame structure having a base portion and an integral side flange portion, a latch member rotatably supported on said base portion and having a plurality of equally spaced symmetrically arranged radially extending teeth, a ratchet element rotatable with said latch member and having a plurality of equally spaced symmetrically arranged radially extending ratchet teeth, a detent member pivotally supported on said base portion and having a latch blocking portion adapted to engage said teeth of said ratchet element to prevent rotation thereof in unlatching direction, an actuating member pivotally mounted on said base portion for movement in a plane substantially parallel thereto, said actuating member having an integral portion directly engageable with said detent member whereby movement of said actuating member in one direction will disengage said detent member from said ratchet member, said detent member being movable in unlatching direction independently of said actuating member, a lock member mounted on said side flange portion of said frame structure for movement into and out of a locking position in which said lock member is disposed in the path of movement of said actuating member and blocks same against movement in said one direction, and a remote control lever pivotally mounted on said side flange portion for movement in a plane substantially parallel thereto between a non-operating position and a latch releasing position, said remote control lever having a portion adapted directly to engage said actuating member and move same in said one direction, said lock member having a portion disposed to be engaged by said remote control lever when said lock member is in locking position prior to engagement of said actuating member by said remote control lever during movement of said remote control lever from non-operating to latch releasing position whereby, when said lock member is in locking position, said lock member will be unlocked by said remote control lever before said actuating member is moved in said one direction.

4. Door control mechanism including, a frame structure having a base portion and a side flange portion, a latch member rotatably supported on said base portion and having a plurality of equally spaced symmetrically arranged radially extending teeth, a ratchet element rotatable with said latch member and having a plurality of equally spaced symmetrically arranged radially extending ratchet teeth, a detent member pivotally supported on said base portion and having a latch blocking portion adapted when in latch blocking position to engage said teeth of said ratchet element to prevent rotation thereof in unlatching direction, an actuating member pivotally mounted on said base portion for movement in a plane substantially parallel thereto, said actuating member having an integral portion directly engageable with said detent member whereby movement of said actuating member in one direction will disengage said detent member from said ratchet member, said detent member being movable in unlatching direction independently of said actuating member, a lock member mounted on said side flange portion of said frame structure for movement into and out of a locking position in which said lock member is disposed in the path of movement of said actuating member and blocks same against movement in said one direction, and a remote control lever pivotally mounted on said side flange portion for movement in a plane substantially parallel thereto between a non-operating position and a latch releasing position, said remote control lever having a portion adapted directly to engage said actuating member and move same in said one direction, said lock member having a portion disposed to be engaged by said remote control lever when said lock member is in locking position prior to engagement of said actuating member by said remote control lever during movement of said remote control lever from non-operating to latch releasing position, whereby, when said lock member is in locking position, said lock member will be unlocked by said remote control lever before said actuating member is moved in said one direction, said detent member having a portion positioned to engage said lock member when said lock member is in locking position and to move said lock member out of locking position upon movement of said detent member from latch blocking to latch released position.

5. In a door control mechanism having a frame structure, a latch member rotatably supported on said frame structure and having a plurality of equally spaced symmetrically arranged radially extending teeth, a ratchet element rotatable with said latch member and having a plurality of equally spaced symmetrically arranged radially extending teeth, actuating means pivotally mounted on said frame for movement from a non-operating position to a latch releasing position and return and including an actuating lever and a detent member connected thereto whereby movement of said actuating lever from said non-operating position to said latch releasing position will effect movement of said detent member from a latch blocking position to a latch released position, said detent member having a latch blocking portion adapted when said detent member is in said latch blocking position to engage a tooth of said ratchet element to prevent rotation of said ratchet element and latch member in unlatching direction, a lock member mounted on said frame for movement into and out of a locking position, said lock member having a portion disposed to engage and prevent movement of said actuating lever into said latch releasing position when said lock member is in said locking position, and a remote control lever pivotally mounted on said frame for movement between a non-operating position and a latch releasing position, said remote control lever having a portion adapted directly to engage said actuating lever and move same from said non-operating position to said latch releasing position, and said lock member having a portion disposed to be engaged by said remote control lever when said lock member is in locking position prior to engagement of said actuating lever by said remote control lever during movement of said remote control lever from non-operating to latch releasing position whereby, when said lock member is in locking position, said lock member will be unlocked by said remote control lever before said actuating lever is moved into latch releasing position.

6. Door control mechanism including, a frame structure having a base portion and an integral side flange portion, a latch member rotatably supported on said base portion and having a plurality of equally spaced symmetrically arranged radially extending teeth, a ratchet element rotatable with said latch member and having a plurality of equally spaced symmetrically arranged radially extending ratchet teeth, actuating means pivotally supported on said base portion and including an actuating lever movable in a plane substantially parallel to said base portion and a detent member having a latch blocking portion adapted to engage said teeth of said ratchet element to prevent rotation thereof in unlatching direction and being connected to said actuating lever whereby movement of said actuating lever in one direction will disengage said detent member from said ratchet member, a lock member mounted on said side flange portion of said frame structure for movement into and out of locking position in which said lock member is disposed in the path of movement of said actuating lever and blocks same against movement in said one direction, and a remote control lever pivotally mounted on said side flange portion for movement in a plane substantially parallel thereto between a non-operating position and a latch releasing position, said remote control lever having a portion adapted directly to engage said actuating lever and move same in said one direction, said lock member having a portion disposed to be engaged by said remote control lever when said lock member is in locking position prior to engagement of said actuating lever by said remote control lever during movement of said remote control lever from non-operating to latch releasing position whereby, when said lock member is in locking position, said lock member will be unlocked by said remote control lever before said actuating lever is moved in said one direction.

References Cited in the file of this patent

UNITED STATES PATENTS

| | | |
|---|---|---|
| 2,301,221 | Marple | Nov. 10, 1942 |
| 2,362,256 | Endter | Nov. 7, 1944 |
| 2,552,815 | Roethel | May 15, 1951 |
| 2,557,468 | Roethel | June 19, 1951 |
| 2,604,345 | Roethel | July 22, 1952 |
| 2,716,569 | Roethel | Aug. 30, 1955 |